(12) United States Patent
Koketsu et al.

(10) Patent No.: US 9,162,920 B2
(45) Date of Patent: Oct. 20, 2015

(54) METHOD FOR MANUFACTURING POROUS GLASS, AND METHOD FOR MANUFACTURING OPTICAL ELEMENT

(75) Inventors: Naoyuki Koketsu, Kawasaki (JP); Zuyi Zhang, Yokohama (JP); Yoshinori Kotani, Yokohama (JP); Akira Sugiyama, Yokohama (JP); Kenji Takashima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 235 days.

(21) Appl. No.: 14/001,666

(22) PCT Filed: Feb. 20, 2012

(86) PCT No.: PCT/JP2012/001101
§ 371 (c)(1),
(2), (4) Date: Aug. 26, 2013

(87) PCT Pub. No.: WO2012/117686
PCT Pub. Date: Sep. 7, 2012

(65) Prior Publication Data
US 2013/0333419 A1  Dec. 19, 2013

(30) Foreign Application Priority Data

Feb. 28, 2011 (JP) ................................ 2011-041738
Jan. 26, 2012 (JP) ................................ 2012-014366

(51) Int. Cl.
C03C 23/00 (2006.01)
C03C 11/00 (2006.01)
C03B 32/00 (2006.01)

(52) U.S. Cl.
CPC ............... *C03C 11/005* (2013.01); *C03B 32/00* (2013.01)

(58) Field of Classification Search
CPC ............................ C03B 32/00; C03C 11/005
See application file for complete search history.

(56) References Cited

U.S. PATENT DOCUMENTS

| | | | | | |
|---|---|---|---|---|---|
| 3,630,700 | A | * | 12/1971 | Hammel | 65/21.4 |
| 3,843,341 | A | * | 10/1974 | Hammel et al. | 502/202 |
| 3,923,533 | A | * | 12/1975 | Hammel et al. | 501/39 |
| 3,923,688 | A | * | 12/1975 | Hammel et al. | 502/207 |
| 3,945,816 | A | * | 3/1976 | Johnson | 65/22 |
| 3,972,720 | A | * | 8/1976 | Hammel et al. | 501/66 |
| 3,972,721 | A | * | 8/1976 | Hammel et al. | 501/39 |
| 4,665,039 | A | * | 5/1987 | Kokubu et al. | 501/39 |
| 2004/0151745 | A1 | * | 8/2004 | Zimmer et al. | 424/401 |
| 2008/0045412 | A1 | * | 2/2008 | Buarque de Macedo | 502/243 |

FOREIGN PATENT DOCUMENTS

DE  4119380 A1  1/1992
JP  59-164648 A  9/1984

OTHER PUBLICATIONS

"New Glass and Its Physical Properties", chap. 2, pp. 47 to 50, supervised by Tetsuro Izumiya, Management System Laboratory. Co., Ltd., published in 1984.

* cited by examiner

*Primary Examiner* — Jason Lazorcik
(74) *Attorney, Agent, or Firm* — Canon U.S.A. Inc., IP Division

(57) ABSTRACT

A method for manufacturing a porous glass includes: forming a phase-separated glass by heating at a temperature in a range of 300 to 500 degrees Celsius for 3 to 50 hours for phase separation of a glass body in which the concentration of $SiO_2$ is 50 to 70 percent by weight, the concentration of $B_2O_3$ is 15 to 40 percent by weight, the concentration of $Li_2O$ is 1.0 to 8.0 percent by weight, the concentration of $Na_2O$ is 2.0 to 8.0 percent by weight, the concentration of $K_2O$ is 0.3 to 5.0 percent by weight, the total concentration of $Li_2O$, $Na_2O$, and $K_2O$ is 3.5 to 15 percent by weight, and the ratio of the concentration of $K_2O$ to the total concentration of $Li_2O$, $Na_2O$, and $K_2O$ is 0.10 to 0.30; and forming a porous glass by etching the phase-separated glass.

5 Claims, 1 Drawing Sheet

METHOD FOR MANUFACTURING POROUS GLASS, AND METHOD FOR MANUFACTURING OPTICAL ELEMENT

TECHNICAL FIELD

The present invention relates to a method for manufacturing a porous glass and a method for manufacturing an optical element.

BACKGROUND ART

A porous glass manufactured using a phase separation phenomenon of glass has a unique porous structure that is uniformly controlled, and the pore diameter of the porous glass can be changed within a predetermined range. By using excellent features as described above, the porous glasses are expected to be used in industrial applications, such as adsorbents, microcarriers, separation membranes, and optical materials.

A conventionally known composition region which performs a phase separation contains approximately 30 to 80 percent by weight of silicon oxide, approximately 22 to 59 percent by weight of boron oxide, and approximately 7 to 15 percent by weight of sodium oxide. In general, a porous glass is obtained by performing a heat treatment on a glass body at 500 to 700 degrees Celsius to cause a phase separation and then performing acid etching (for example, NPL 1).

As for the composition of a phase-separable glass body, in order to improve the strength and chemical durability of a porous glass, some examples of a method forming a porous glass using a phase-separable glass body containing a $SiO_2$—$B_2O_3$—$Na_2O$ glass added with $Al_2O_3$ and $ZrO_2$ have been proposed. However, a heat treatment at 500 degrees Celsius or more is required for a phase separation treatment. In addition, in order to prevent precipitation of gel silica formed of a small amount of silica contained in a non-silica component phase in etching, an example in which an alkali component is adjusted by addition of Li has also been reported (PTL 1). However, since the phase separation excessively progresses by addition of Li, it becomes difficult to control the pore diameter by a heat treatment.

In addition, when a porous glass is used as an optical material, the pore diameter and porosity thereof are each an important parameter. By decreasing the pore diameter, scattering of internal light can be suppressed. In addition, by increasing the porosity, an apparent refractive index is decreased, and this porous glass functions as a glass having a low reflectance. Accordingly, when the pore diameter can be controlled, and the porosity can be increased, the degree of freedom of designing optical materials can be increased. Therefore, a material, the pore diameter and porosity of which can be controlled, has been desired. However, in order to increase the porosity, a heat treatment performed at a high temperature is required. Therefore, a phase-separable glass body composition which can form a porous glass having a high porosity by a heat treatment at a low temperature has been desired.

CITATION LIST

Patent Literature

PTL 1: Japanese Patent Laid-Open No. 59-164648

Non Patent Literature

[NPL 1]
"New Glass and Its Physical Properties", chap. 2, pp. 47 to 50, supervised by Tetsuro lzumiya, Management System Laboratory Co., Ltd., published in 1984.

SUMMARY OF INVENTION

Technical Problem

In the above method for manufacturing a porous glass using a phase separation phenomenon of a conventional technique, a heat treatment at a high temperature necessary for the phase separation is performed. Therefore, in consideration of loads and costs in manufacturing process, the temperature of the heat treatment for the phase separation has been required to be decreased.

The present invention was made in consideration of the background technique as described above and provides a method for manufacturing a porous glass which can control the pore diameter and the porosity by performing a phase separation treatment using a heat treatment at a low temperature.

Solution to Problem

A method for manufacturing a porous glass of the present invention comprises the steps of: forming a phase-separated glass by heating at a temperature in a range of 300 to 500 degrees Celsius for 3 to 50 hours for phase separation of a glass body in which the concentration of $SiO_2$ is in a range of 50 to 70 percent by weight, the concentration of $B_2O_3$ is in a range of 15 to 40 percent by weight, the concentration of $Li_2O$ is in a range of 1.0 to 8.0 percent by weight, the concentration of $Na_2O$ is in a range of 2.0 to 8.0 percent by weight, the concentration of $K_2O$ is in a range of 0.3 to 5.0 percent by weight, the total concentration of $Li_2O$, $Na_2O$, and $K_2O$ is in a range of 3.5 to 15 percent by weight, and the ratio of the concentration of $K_2O$ to the total concentration of $Li_2O$, $Na_2O$, and $K_2O$ is in a range of 0.10 to 0.30; and forming a porous glass by etching the phase-separated glass.

Advantageous Effects of Invention

The present invention provides a method for manufacturing a porous glass which performs a phase separation treatment by a heat treatment at a low temperature and which can control the pore diameter and the porosity.

DESCRIPTION OF EMBODIMENTS

Figure 1:
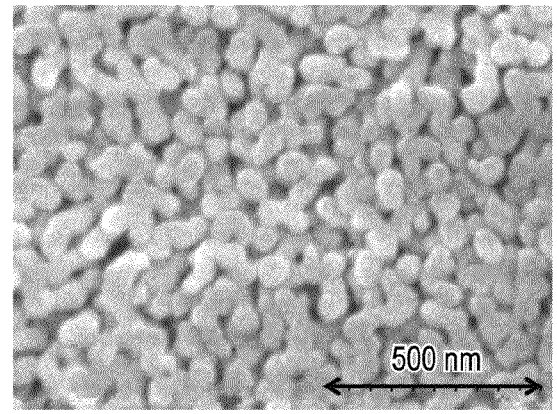
FIG. 1 is a scanning electron microscope photograph of a porous glass formed in Example 1.

Hereinafter, embodiments of the invention will be described in detail.

A phase-separable glass body of the present invention is an alkali borosilicate glass having a specific composition. In particular, a phase-separable glass body of the present invention has a composition which can decrease a temperature of a heat treatment for the phase separation and in which lithium oxide ($Li_2O$) and potassium oxide ($K_2O$) are introduced into a silicon oxide ($SiO_2$)-boric acid ($B_2O_3$)-sodium oxide ($Na_2O$)-based phase-separable glass body.

In more particular, the phase-separable glass body according to the present invention has a composition containing 50 to 70 percent by weight of $SiO_2$, 15 to 40 percent by weight of $B_2O_3$, 1.0 to 8.0 percent by weight of $Li_2O$, 2.0 to 8.0 percent by weight of $Na_2O$, and 0.3 to 5.0 percent by weight of $K_2O$.

In addition, in the relationship among the alkali components ($Li_2O$, $Na_2O$, and $K_2O$) of the above composition, the total concentration of $Li_2O$, $Na_2O$, and $K_2O$ (hereinafter referred to as "$Li_2O+Na_2O+K_2O$") is in a range of 3.5 to 15 percent by weight. In addition, the ratio of the concentration of $K_2O$ to the total concentration of $Li_2O$, $Na_2O$, and $K_2O$ (hereinafter, referred to "$K_2O/(Li_2O+Na_2O+K_2O)$") is in a range of 0.10 to 0.30. That is, $K_2O$, which is the third alkali oxide, accounts for 10 to 30 percent of the total alkali oxides. In the present invention, the alkali includes Li, Na, or K. Incidentally, Rb or Cs may be used instead of K. The phase-separable property indicates a property which causes a phase separation by a heat treatment. As for the "phase separation" forming a porous structure of the present invention, the case will be described by way of example in which a borosilicate glass containing silicon oxide, boron oxide, and an oxide containing an alkali metal is used as a glass body. The "phase separation" indicates a separation which occurs inside glass, on the scale of several nanometers to several tens of micrometers, into a phase (non-silicon oxide rich phase) in which the content of the oxide containing an alkali metal and that of the boron oxide are higher than those before the phase separation and a phase (silicon oxide rich phase) in which the content of the oxide containing an alkali metal and that of the boron oxide are lower than those before the phase separation. In addition, a glass which is phase-separated is processed by an etching treatment to remove the non-silicon oxide rich phase, so that a porous structure is formed in the glass body. As the phase separation, there are a spinodal type and a binodal type phase separation. Pores of a porous glass obtained by the spinodal type phase separation are each a through hole connecting from the surface to the inside. In more particular, the structure derived from the spinodal type phase separation is an "ant nest"-shaped structure in which holes are entangled in a three dimensional manner. In this structure, the skeleton formed of silicon oxide corresponds to a "nest", and the through holes each correspond to an "ant hole". On the other hand, a porous glass obtained by the binodal type phase separation has the structure in which independent holes, each of which is a hole surrounded by a closed surface having an approximately spherical shape, are discontinuously present in the skeleton formed of silicon oxide. From results obtained by morphology observation using an electron microscope, the hole derived from the spinodal type phase separation and the hole derived from the binodal type phase separation can be determined and discriminated from each other. In addition, when the composition of the glass body and/or the temperature at the phase separation is controlled, the spinodal type phase separation or the binodal type phase separation is determined.

The phase-separable glass body of the present invention is preferably formed of a composition containing 50 to 70 percent by weight of $SiO_2$, 20 to 35 percent by weight of $B_2O_3$, 1.5 to 5.0 percent by weight of $Li_2O$, 2.0 to 6.0 percent by weight of $Na_2O$, and 0.8 to 4.0 percent by weight of $K_2O$.

In addition, in the preferable relationship among the alkali components of the above composition, $Li_2O+Na_2O+K_2O$ is more preferably in a range of 4.3 to 15 percent by weight.

Furthermore, a preferable composition of the phase-separable glass body of the present invention contains 55 to 70 percent by weight of $SiO_2$, 25 to 35 percent by weight of $B_2O_3$, 1.5 to 3.0 percent by weight of $Li_2O$, 2.5 to 5.5 percent by weight of $Na_2O$, and 0.8 to 3.0 percent by weight of $K_2O$.

In addition, in the preferable relationship among the alkali components of the above composition, $Li_2O+Na_2O+K_2O$ is more preferably in a range of 4.8 to 11 percent by weight.

However, the phase-separable glass body of the present invention may also contain components others other than $SiO_2$, $B_2O_3$, $Li_2O$, $Na_2O$, and $K_2O$. As the other components, impurity components contained in a raw material, impurity components mixed during a manufacturing process, and the like may be mentioned. As the other components, for example, $Al_2O_3$ may be mentioned. The content of the other components to the total content of $SiO_2$, $B_2O_3$, $Li_2O$, $Na_2O$, and $K_2O$ is preferably 3.0 percent by weight or less and particularly preferably 2.0 percent by weight or less.

$Li_2O$ is necessary in order to decrease the heating temperature for the phase separation, and as described above, the lower limit is 1.0 percent by weight or more and preferably 1.5 percent by weight or more. In addition, since control of the phase separation becomes difficult when the content of $Li_2O$ is high, the upper limit thereof is 8.0 percent by weight or less, preferably 5.0 percent by weight or less, and most preferably 3.0 percent by weight or less.

In order to control the pore diameter and the porosity, the lower limit of the content of $K_2O$, which is the third alkali oxide, (rubidium oxide ($Rb_2O$) and/or cesium oxide ($Cs_2O$) may also be used besides $K_2O$ or instead thereof) is 0.3 percent by weight or more and preferably 0.8 percent by weight or more. In addition, since it becomes difficult to perform the phase separation by a heat treatment at 500 degrees Celsius or less when the content is more than 5.0 percent by weight, the upper limit is 5.0 percent by weight or less, preferably 4.0 percent by weight or less, and most preferably 3.0 percent by weight or less.

The content of $Na_2O$ may be set in a range of 2.0 to 8.0 percent by weight so that the content of the alkali oxides, that is, $Li_2O+Na_2O+K_2O$, is in a range of 3.5 to 15.0 percent by weight, preferably in a range of 4.3 to 15.0 percent by weight, and most preferably in a range of 4.8 to 11.0 percent by weight.

The method for manufacturing a phase-separable glass body of the present invention can be performed by a common method for manufacturing a glass except that the types of components of a raw material are different from those of the common method. As a material of a general phase-separable glass body, for example, an alkali borosilicate glass, such as a silicon oxide-boron oxide-alkali metal oxide or a silicon oxide-boric acid-alkali metal carbonate, is preferably used as a silicon oxide-based glass.

According to the present invention, in the method for manufacturing a phase-separable glass body, a raw material having the above composition range obtained by uniform mixing is melted by heating at a temperature in a range of 1,350 to 1,450 degrees Celsius. Subsequently, the above molten mixture is formed into a plate shape, so that a phase-separable glass body is formed. No excessive phase separation progresses at the stage after the melting, and a phenomenon, such as devitrification, does not occur. When the amount of the third alkali oxide (potassium oxide, rubidium oxide, and/or cesium oxide) is less than 10 percent of all the alkali oxides, the phase separation excessively progresses, and it becomes difficult to control the phase separation by a subsequent heat treatment step.

Except for preparation of a raw material having the composition as described above, manufacturing can be performed using a known method. For example, manufacturing can be performed in such a way that a raw material containing individual components is melted by heating and is then formed into a desired shape, if needed. Although a heating temperature in the heat melting may be appropriately set in accordance with a raw material composition and the like, the heating temperature is generally set in a range of 1,350 to 1,450 degrees Celsius and particularly preferably in a range of 1,380 to 1,430 degrees Celsius.

For example, after silicon oxide, boric acid, and sodium carbonate are uniformly mixed together as the raw material, heat melting may be performed at 1,350 to 1,450 degrees Celsius.

In addition, when a porous glass is formed into a predetermined shape, after a phase-separable glass body is synthesized, this glass body may be formed into various shapes, such as a tube, a plate, and a ball, at a temperature of approximately 1,000 to 1,200 degrees Celsius. For example, a method may be preferably used in which after a phase-separable glass body is synthesized by melting the above raw material, this glass body is molded in the state in which after the melting temperature is decreased, a temperature of 1,000 to 1,200 degrees Celsius is maintained.

Next, a method for manufacturing a porous glass according to the present invention will be described.

The method for manufacturing a porous glass according to the present invention has a step of performing a phase separation of the above phase-separable glass body by a heat treatment into a silicon oxide rich phase and a non-silicon oxide rich phase and a step of removing the non-silicon oxide rich phase by an acid treatment.

Phase Separation Step

First, the above phase-separable glass body is phase-separated by a heat treatment into a silicon oxide rich phase and a non-silicon oxide rich phase to form a phase-separated glass.

By using a glass body having the above composition, the phase separation can be performed at 500 degrees Celsius or less and in particular even at a low temperature in a range of 300 to 500 degrees Celsius. Since the phase separation can be performed by a low-temperature heat treatment as described above, industrial advantages in terms of loads and costs in manufacturing process can be obtained. In addition, in the structure in which a porous glass layer is formed on a substrate, a heat-resistance temperature of the substrate may be low; hence, the number of materials of the substrate to be selected is increased, and the application is expected to be expanded. In addition, when a porous glass is used as an optical element, by a strain caused by a high-temperature heat treatment, in-plane irregularity of optical properties may be generated in some cases; however, by a low-temperature heat-treatment, the probability thereof can be reduced. Since a heating time is 3 to 50 hours, which is relatively a short period of time even at a low temperature, industrial advantages in terms of loads and costs in manufacturing process can be obtained.

A phase separation region can be increased by introducing $Li_2O$ into the glass body, and the phase separation can be performed at a relatively low temperature. However, since the control of the phase separation cannot be easily performed only by introduction of $Li_2O$, the third alkali oxide ($K_2O$, $Rb_2O$, and/or $Cs_2O$) is introduced into the glass body, so that the phase separation can be controlled. However, if the third alkali oxide ($K_2O$, $Rb_2O$, and/or $Cs_2O$) is more than 30 percent of the total alkali oxides, no phase separation occurs at 500 degrees Celsius or less. In addition, the third alkali oxide ($K_2O$, $Rb_2O$, and/or $Cs_2O$) also has an effect of increasing the porosity. The volume to be removed can be increased when the porous material is formed by adding a potassium, a rubidium, and/or a cesium element, each having a large radius. Furthermore, a mixed alkali effect is obtained when a plurality of alkali components is contained, and advantages, such as a decrease in softening point and easier processing, can be obtained.

Acid Treatment Step

Next, a step in which the non-silicon oxide rich phase of the phase-separated glass is removed by etching to form a porous glass is performed. In particular, the phase-separated glass obtained by the phase separation step is brought into contact with an acid solution, so that an acid soluble component (non-silicon oxide rich phase) is removed by dissolution. As the acid solution, for example, an inorganic acid, such as hydrochloric acid or nitric acid, may be used. In general, the acid solution can be preferably used in the form of an aqueous solution using water as a solvent. In general, the concentration of the acid solution may be appropriately set in a range of 0.1 to 2 mol/L. In this acid treatment step, a solution temperature may be set to 100 degrees Celsius or less, and a treatment time may be set in a range of 1 to 50 hours.

Water Washing Treatment

Next, a water washing treatment is performed. A porous glass having a skeleton formed of silicon oxide is obtained through the water washing treatment. In general, the temperature of washing water in the water washing treatment may be set in a range of room temperature to 100 degrees Celsius. Although the time for the water washing treatment may be appropriately determined in accordance with the composition, the size, and the like of a glass to be processed, in general, the time may be set in a range of 1 to 50 hours.

Although the average pore diameter of the porous glass is not particularly limited, the average pore diameter is preferable in a range of 1 nm to 1 micrometers, particularly preferably in a range of 2 nm to 0.5 micrometers, and even more preferably in a range of 10 nm to 100 nm. The porosity of the porous glass is generally preferably in a range of 20 to 80 percent and particularly preferably in a range of 30 of 70 percent.

The shape of the porous glass is not particularly limited, and for example, a film-shaped molded body in the form of a tube, a plate, or the like may be mentioned. The shapes may be appropriately selected in accordance with, for example, the application of the porous glass. In addition, the porous glass may be formed as a layer on the substrate. The surface of the substrate is not limited to a flat surface but may also be a curved surface of a lens or the like.

Since the porous structure of the porous glass can be uniformly controlled, and the pore diameter can be changed within a predetermined range, the porous glass is expected to be used in applications, such as adsorbents, microcarriers, separation membranes, and optical elements.

The optical element of the present invention has a porous glass obtained by the method for manufacturing a porous glass described above. Since the porous structure can be controlled in a wide range, the optical element of the present invention is used for optical lenses of imaging, observation, projection, and scanning optical systems, polarizing plates of display devices, and the like.

EXAMPLES

Hereinafter, examples of the present invention will be particularly described. However, the present invention is not limited to the following examples.

Evaluation of porous glasses of examples and comparative examples was performed by the following method.

(1) Surface Observation

Surface observation (accelerating voltage: 5 kV) of the porous glass was performed using a scanning electron microscope (FE-SEMS-4800, manufactured by Hitachi Ltd.).

Example 1

As a glass raw material, silicon dioxide, boric acid, sodium carbonate, lithium carbonate, and potassium carbonate were used, and after these components were uniformly mixed together at a composition ratio: $SiO_2:B_2O_3:Na_2O:Li_2O:K_2O=64.2:28.5:4.2:2.3:0.8$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained. No phase separation occurred in this state, and a phenomenon, such as devitrification, was also not observed.

A Heat treatment was performed for the plate-shaped phase-separable glass body at each temperature of 300, 400, and 500 degrees Celsius for 50 hours. Subsequently, the glass body thus processed was placed in a nitric acid solution at a concentration of 1 mol/L (1 N) and was then held at 80 degrees Celsius for 24 hours. Next, washing was performed with water having a temperature of 80 degrees Celsius for 24 hours, and porous glasses 1A, 1B, and 1C were obtained.

The surface of the porous glass 1B thus obtained was observed using an electron microscope. A scanning electron microscope (SEM) photograph is shown in FIG. 1. It is found that phase separation occurs at a heat treatment temperature of 400 degrees Celsius. That is, it is found that at a temperature of 400 degrees Celsius, development of the phase separation can be controlled. As in the case described above, it was confirmed that in the porous glasses 1A and 1C which were heat-treated at 300 and 500 degrees Celsius, respectively, for 50 hours, the phase separation was developed. That is, it was found that at a temperature in a range of 300 to 500 degrees Celsius, the development of the phase separation could be controlled.

Example 2

As a glass raw material, silicon dioxide, boric acid, sodium carbonate, lithium carbonate, and potassium carbonate were used, and after these components were uniformly mixed together at a composition ratio: $SiO_2: B_2O_3:Na_2O: Li_2O: K_2O=63.9:28.3:3.2:2.3:2.3$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained. As in the case of Example 1, no phase separation occurred, and a phenomenon, such as devitrification, was also not observed.

The following treatment was performed in a manner similar to that of Example 1, and porous glasses 2A, 2B, and 2C were obtained.

Figure 2:
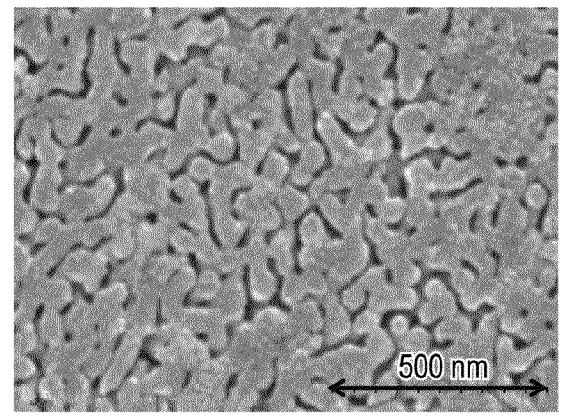
FIG. 2 is a scanning electron microscope photograph of a porous glass formed in Example 2.

The surface of the glass thus obtained was observed using an electron microscope. A photograph of the surface of the porous glass 2B which was heat-treated at 400 degrees Celsius for 50 hours is shown in FIG. 2. Development of the phase separation was confirmed by a heat treatment at 400 degrees Celsius. In addition, as in the case described above, it was confirmed that in the porous glasses 2A and 2C which were heat-treated at 300 and 500 degrees Celsius, respectively, for 50 hours, the phase separation was developed. That is, it was found that at a temperature in a range of 300 to 500 degrees Celsius, the development of the phase separation could be controlled.

Example 3

As a glass raw material, silicon dioxide, boric acid, sodium carbonate, lithium carbonate, and potassium carbonate were used, and after these components were uniformly mixed together at a composition ratio: $SiO_2:B_2O_3:Na_2O:Li_2O:K_2O=64.1:28.4:3.7:2.3:1.5$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained.

The following treatment was performed in a manner similar to that of Example 1, and porous glasses 3A, 3B, and 3C were obtained. According to the results of observation of the surface of the glass thus obtained using an electron microscope, development of the phase separation of each of the porous glasses 3A, 3B, and 3C which were heat-treated at 300, 400, and 500 degrees Celsius, respectively, for 50 hours were confirmed.

Example 4

As a glass raw material, silicon dioxide, boric acid, sodium carbonate, lithium carbonate, and potassium carbonate were used, and after these components were uniformly mixed together at a composition ratio: $SiO_2:B_2O_3:Na_2O:Li_2O:K_2O=63.3:28.1:4.8:1.5:2.3$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained.

The following treatment was performed in a manner similar to that of Example 1, and porous glasses 4A, 4B, and 4C were obtained. According to the results of observation of the surface of the glass thus obtained using an electron microscope, development of the phase separation of each of the porous glasses 4A, 4B, and 4C which were heat-treated at 300, 400, and 500 degrees Celsius, respectively, for 50 hours were confirmed.

Comparative Example 1

As a glass raw material, silicon dioxide, boric acid, sodium carbonate, lithium carbonate, and potassium carbonate were used, and after these components were uniformly mixed together at a composition ratio: $SiO_2:B_2O_3:Na_2O:Li_2O:K_2O=64.3:28.5:4.4:2.3:0.5$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained.

In the state described above, the phase separation progressed, and it was difficult to control the phase separation by a heat treatment. When the amount of $K_2O$ is small, the phase separation progresses at a cooling stage for forming a phase-separable glass body, and hence, the phase separation cannot be controlled by a heat treatment. Therefore, it is difficult to control the pore diameter and the porosity.

Comparative Example 2

As a glass raw material, silicon dioxide, boric acid, sodium carbonate, lithium carbonate, and potassium carbonate were used, and after these components were uniformly mixed together at a composition ratio: $SiO_2:B_2O_3:Na_2O:Li_2O:K_2O=63.8:28.3:3.0:2.3:2.6$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained. The phase separation was not developed, and a transparent film was formed.

A heat treatment was performed for the plate-shaped phase-separable glass body at a temperature of 400 degrees Celsius for 50 hours. Subsequently, the glass body thus processed was placed in a nitric acid solution at a concentration of 1 mol/L (1 N) and was then held at 80 degrees Celsius for 24 hours. Next, washing was performed with water having a temperature of 80 degrees Celsius for 24 hours, and a step of obtaining a porous glass was performed.

Figure 3:
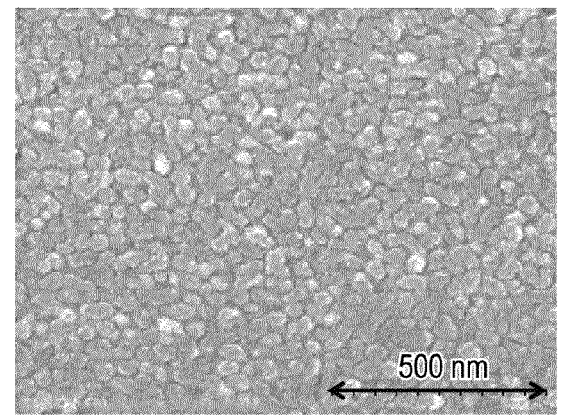
FIG. 3 is a scanning electron microscope photograph of a porous glass formed in Comparative Example 2.

The results of observation of the surface of the glass thus obtained using an electron microscope is shown in FIG. 3, and it is found that since no phase separation occurs, a silicon oxide skeleton is not formed, and a porous glass is not formed.

Comparative Example 3

As a glass raw material, silicon dioxide, boric acid, sodium carbonate, and lithium carbonate were used, and after these components were uniformly mixed together at a composition ratio: $SiO_2:B_2O_3:Na_2O:Li_2O=64.4:28.6:4.7:2.3$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained.

As in the case of Comparative Example 1, the phase separation progresses before a heat treatment, and the phase separation cannot be controlled. In addition, the pore diameter is large, such as 200 nm or more, and it becomes difficult to form a fine porous material.

Comparative Example 4

As a glass raw material, silicon dioxide, boric acid, sodium carbonate, and potassium carbonate were used, and after these components were uniformly mixed together at a composition ratio: $SiO_2:B_2O_3:Na_2O:K_2O=61.4:27.2:4.5:6.9$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained.

The phase separation is not observed by a heat treatment at 400 degrees Celsius for 50 hours. In addition, the phase separation is also not observed by a heat treatment at 600 degrees Celsius for 50 hours.

Comparative Example 5

As a glass raw material, silicon dioxide, boric acid, and sodium carbonate were used, and after these components were uniformly mixed together at a composition ratio: $SiO_2:B_2O_3:Na_2O=62.9:27.9:9.2$ (percent by weight), heat melting was performed at 1,400 degrees Celsius. Subsequently, in the state in which the above mixture was formed into a plate, spontaneous cooling was performed, so that a phase-separable glass body in the form of a plate having a thickness of approximately 1 mm was obtained.

The phase separation was not confirmed by a heat treatment at 400 degrees Celsius for 50 hours. In addition, by a heat treatment at 560 degrees Celsius for 50 hours, a porous glass having a spinodal structure is formed.

The results of the above Examples and Comparative Examples are collectively shown in Table 1.

TABLE 1

| | $SiO_2$ (wt %) | $B_2O_3$ (wt %) | $Na_2O$ (wt %) | $Li_2O$ (wt %) | $K_2O$ (wt %) | $K_2O$ Ratio | Heat treatment temperature (° C.) | Phase separation |
|---|---|---|---|---|---|---|---|---|
| Example 1 | 64.2 | 28.5 | 4.2 | 2.3 | 0.8 | 0.11 | 300 | a |
| | | | | | | | 400 | a |
| | | | | | | | 500 | a |
| Example 2 | 63.9 | 28.3 | 3.2 | 2.3 | 2.3 | 0.29 | 300 | a |
| | | | | | | | 400 | a |
| | | | | | | | 500 | a |
| Example 3 | 64.1 | 28.4 | 3.7 | 2.3 | 1.5 | 0.20 | 300 | a |
| | | | | | | | 400 | a |
| | | | | | | | 500 | a |
| Example 4 | 63.3 | 28.1 | 4.8 | 1.5 | 2.3 | 0.27 | 300 | a |
| | | | | | | | 400 | a |
| | | | | | | | 500 | a |
| Comparative Example 1 | 64.3 | 28.5 | 4.4 | 2.3 | 0.5 | 0.07 | — | a |
| Comparative Example 2 | 63.8 | 28.3 | 3.0 | 2.3 | 2.6 | 0.33 | 400 | — |
| Comparative Example 3 | 64.4 | 28.6 | 4.7 | 2.3 | — | 0 | — | a |
| Comparative Example 4 | 61.4 | 27.2 | 4.5 | — | 6.9 | 0.61 | 400 | — |
| | | | | | | | 600 | — |
| Comparative Example 5 | 62.9 | 27.9 | 9.2 | — | — | 0 | 400 | — |
| | | | | | | | 560 | a |

(Note 1) "$K_2O$" Ratio indicates $K_2O/(Li_2O+Na_2O+K_2O)$.

(Note 2) "a" of Phase separation indicates that the phase separation is confirmed by a treatment performed at a heat treatment temperature. "−" indicates that no phase separation is confirmed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-041738, filed Feb. 28, 2011 and No. 2012-014366, filed Jan. 26, 2012, which are hereby incorporated by reference herein in their entirety.

INDUSTRIAL APPLICABILITY

Since the phase-separable glass body of the present invention can control a phase separation at a low-temperature heat treatment, a porous glass can be formed at a low cost. Since the porosity can be controlled, the phase-separable glass body can be widely used in optical element applications. In addition, the phase-separable glass body can be used as a significantly effective material in precision, electronics, and food industrial fields.

The invention claimed is:

1. A method for manufacturing a porous glass comprising the steps of:

forming a phase-separated glass by heating at a temperature in a range of 300 to 500 degrees Celsius for 3 to 50 hours for phase separation of a glass body in which the concentration of $SiO_2$ is in a range of 50 to 70 percent by weight, the concentration of $B_2O_3$ is in a range of 15 to 40 percent by weight, the concentration of $Li_2O$ is in a range of 1.0 to 8.0 percent by weight, the concentration of $Na_2O$ is in a range of 2.0 to 8.0 percent by weight, the concentration of $K_2O$ is in a range of 0.3 to 5.0 percent by weight, the total concentration of $Li_2O$, $Na_2O$, and $K_2O$ is in a range of 3.5 to 15 percent by weight, and the ratio of the concentration of $K_2O$ to the total concentration of $Li_2O$, $Na_2O$, and $K_2O$ is in a range of 0.10 to 0.30; and forming a porous glass by etching the phase-separated glass.

2. The method for manufacturing a porous glass according to claim 1, wherein in the glass body, the concentration of $SiO_2$ is in a range of 50 to 70 percent by weight, the concentration of $B_2O_3$ is in a range of 20 to 35 percent by weight, the concentration of $Li_2O$ is in a range of 1.5 to 5.0 percent by weight, the concentration of $Na_2O$ is in a range of 2.0 to 6.0 percent by weight, the concentration of $K_2O$ is in a range of 0.8 to 4.0 percent by weight, and the total concentration of $Li_2O$, $Na_2O$, and $K_2O$ is in a range of 4.3 to 15 percent by weight.

3. The method for manufacturing a porous glass according to claim 1, wherein in the glass body, the concentration of $SiO_2$ is in a range of 55 to 70 percent by weight, the concentration of $B_2O_3$ is in a range of 25 to 35 percent by weight, the concentration of $Li_2O$ is in a range of 1.5 to 3.0 percent by weight, the concentration of $Na_2O$ is in a range of 2.5 to 5.5 percent by weight, the concentration of $K_2O$ is in a range of 0.8 to 3.0 percent by weight, and the total concentration of $Li_2O$, $Na_2O$, and $K_2O$ is in a range of 4.8 to 11 percent by weight.

4. A method for manufacturing an optical element having a porous glass, wherein a step of forming the porous glass is performed by the method for manufacturing a porous glass according to claim 1.

5. The method for manufacturing a porous glass according to claim 1, wherein only $SiO_2$, $B_2O_3$, $Li_2O$, $Na_2O$, and $K_2O$ are included in the glass body.

* * * * *